United States Patent [19]
Jippo

[11] Patent Number: 5,404,477
[45] Date of Patent: Apr. 4, 1995

[54] EXTENDED MEMORY ADDRESS CONVERSION AND DATA TRANSFER CONTROL SYSTEM

[75] Inventor: Akira Jippo, Tokyo, Japan
[73] Assignee: NEC Corporation, Tokyo, Japan
[21] Appl. No.: 131,876
[22] Filed: Oct. 5, 1993

Related U.S. Application Data

[63] Continuation of Ser. No. 494,469, Mar. 16, 1990, abandoned.

[30] Foreign Application Priority Data

Mar. 16, 1989 [JP] Japan ................................. 1-62264

[51] Int. Cl.⁶ ............................................. G06F 12/08
[52] U.S. Cl. ................................................... 395/400
[58] Field of Search ............................ 395/400, 425; 364/200 MS File, 900 MS File, DIG. 1, DIG. 2

[56] References Cited

U.S. PATENT DOCUMENTS

| | | | |
|---|---|---|---|
| 4,758,951 | 7/1988 | Sznyter, III | 395/400 |
| 4,761,733 | 8/1988 | McCrocklin et al. | 395/400 |
| 4,926,322 | 5/1990 | Stimac et al. | 395/500 |
| 5,012,407 | 4/1991 | Finn | 395/700 |
| 5,127,094 | 6/1992 | Bono | 395/400 |
| 5,129,088 | 7/1992 | Auslander et al. | 395/700 |
| 5,131,089 | 7/1992 | Cole | 395/425 |

OTHER PUBLICATIONS

SX A Series, NEC Supercomputer, General Description, NEC Corporation, pp. 1-1-5-41, Oct. 1988, 5th Edition.

Primary Examiner—Jack B. Harvey
Assistant Examiner—Jack A. Lane
Attorney, Agent, or Firm—Foley & Lardner

[57] ABSTRACT

An extended memory address control system includes a disk address designation unit for managing the extended memory as a virtual disk, a disk address conversion unit for converting a virtual disk address designated by the disk address designation unit to a first physical address of the extended memory, a memory address designation unit for managing the extended memory as a continuous memory space, a memory address conversion unit for converting a memory address designated by the memory address designation unit to a second physical address of the extended memory, a type discrimination unit for discriminating whether the extended memory is managed as a virtual disk or a continuous memory space, and an access control unit for accessing the extended memory using one of the first and second physical addresses indicated by the type discrimination unit.

3 Claims, 4 Drawing Sheets

EXTENDED MEMORY ADDRESS CONVERSION AND DATA TRANSFER CONTROL SYSTEM

This application is a continuation of application Ser. No. 07/494,469, filed Mar. 16, 1990, now abandoned.

BACKGROUND OF THE INVENTION

The present invention relates to an extended memory address control system.

Supercomputers have arithmetic processing speeds much higher than that of general computers, and can solve various equations expressing natural phenomena using a large volume of data at high speed for a variety of studies and technical developments in scientific and technical fields.

For example, if a crush test of vehicle bodies by a vehicle manufacturer can be simulated using a supercomputer, the number of vehicles used in a test can be decreased. An aircraft manufacturer employs a supercomputer to analyze air vortices formed around wings which have been tested using a wind tunnel.

In a supercomputer which conducts large-scale scientific technical calculations, the scale of a problem as an object to be calculated is also increased, and a huge volume of data is necessary.

Therefore, a large amount of data is stored in a secondary memory such as a magnetic disk device. Thus, calculations are executed while inputting/outputting data between the magnetic disk device and a main memory. Therefore, an input/output (I/O) time between the secondary and main memories greatly influences performance of the entire program. Thus, the supercomputer has an extended memory to increase an I/O speed.

A supercomputer of this type comprises a system controller, an I/O processor connected thereto, a control processor, a high-speed arithmetic processor, a first main memory, a second main memory, and an extended memory.

The control processor has a supervisor function, and realizes I/O control, and a compiler and a linker for user programs. The first main memory stores a control program for controlling the control processor.

The second main memory stores load modules of the user programs, and data. The high-speed arithmetic processor executes the user programs.

The I/O processor controls data transfer between peripheral devices such as a magnetic disk, and the first main memory.

The I/O processor, the control processor, and the high-speed arithmetic processor can be operated independently of each other, thus improving a throughput of the system.

Data transfer between the extended memory and the second main memory is controlled by commands on the high-speed arithmetic processor.

Data transfer between the extended memory and the first main memory is controlled by commands on the control processor.

In a conventional information processing apparatus of this type, an extended memory is managed as a virtual disk for a user to increase an I/O speed.

However, since a buffer size is extended to increase a hit rate and to decrease the number of I/O times in order to increase a database access speed, a large buffer must be allocated to the extended memory since the main memory has a limited memory size.

In this case, if the extended memory is managed as the virtual disk, since it has discontinuous address spaces, an overhead of managing address spaces is increased when a large-sized buffer is to be allocated. Thus, an address management module must be called at many positions of an operating system for each access, thus impairing performance.

In the conventional supercomputer, since addresses of the extended memory are managed as the virtual disk addresses, they cad,not be recognized as continuous addresses on the operating system. Thus, backing store I/Os frequently occur since a large logical space is used when a buffer having a large number of continuous addresses is prepared in the extended memory to increase a database access speed. When the extended memory is utilized as a paging backing store, a swapping backing store, or their caches to improve performance of the system or to shorten a TSS (Time Sharing System) response time, or when a file on a disk is mapped on a logical space to access the file by a transfer command. Thus, when the extended memory is used as a backing store to improve performance, an overhead of managing address spaces is increased. As a result, as the number of access times of the extended memory is increased, access performance is impaired.

SUMMARY OF THE INVENTION

It is therefore an object of the present invention to provide an extended memory address control system which can reduce an overhead of managing address spaces to improve access performance.

In order to achieve the above object, according to the present invention, there is provided an extended memory address control system in an information processing apparatus for performing data transfer between an extended memory and a main memory, comprising: disk address designation unit for managing the extended memory as a virtual disk; disk address conversion unit for converting a virtual disk address designated by the disk address designation unit to a first physical address of the extended memory; memory address designation unit for managing the extended memory as a continuous memory space; memory address conversion unit for converting a memory address designated by the memory address designation unit to a second physical address of the extended memory; type discrimination unit for discriminating whether the extended memory is managed as a virtual disk or a continuous memory space; and access control unit for accessing the extended memory using one of the first and second physical addresses in accordance with the type determination indicated by the type discrimination unit.

DESCRIPTION OF THE PREFERRED EMBODIMENT

The present invention will be described hereinafter with reference to the accompanying drawings.

Figure 1:
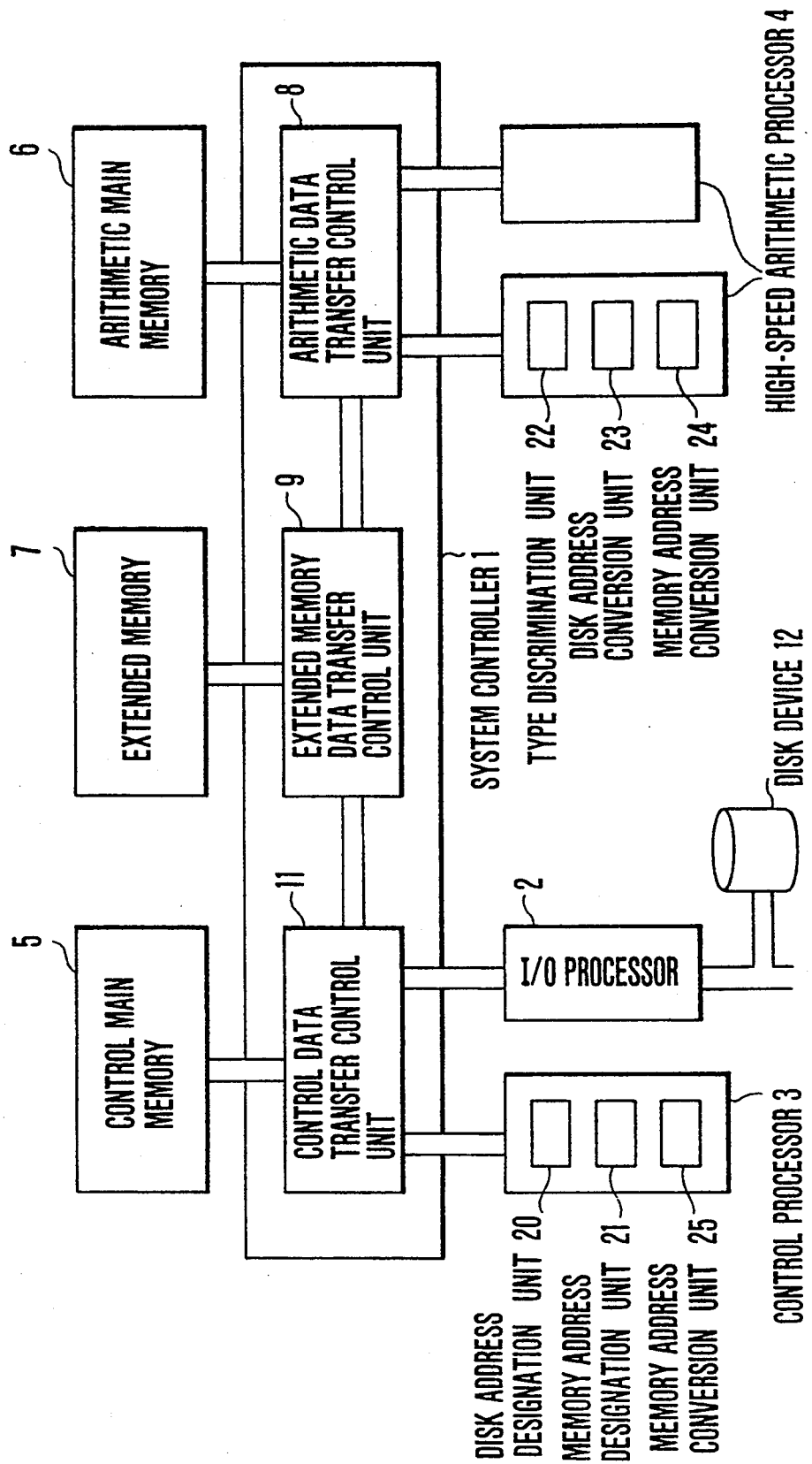
FIG. 1 is a block diagram showing an arrangement of an information processing apparatus to which an extended memory address control system according to an embodiment of the present invention is applied.

Referring to FIG. 1, an information processing apparatus to which an extended memory address control system according to an embodiment of the present invention is applied comprises a system controller 1, an I/O processor 2, connected thereto, for controlling system I/Os, a control processor 3 having program compiling and linking functions, and a supervisor function, a high-speed arithmetic processor 4 for executing a user program mainly consisting of vector calculations at high speed, a control main memory 5 which serves as a memory for the control processor 3 and on which an operating system function can be operated, a large-capacity, high-speed arithmetic main memory 6 which is used for the high-speed arithmetic processor 4 and stores vector data of user programs mainly consisting of vector calculations and user programs executed by the high-speed arithmetic processor 4, and an extended memory 7.

The system controller 1 includes an extended memory data transfer control unit 9 for controlling data transfer between the extended memory 7 and the control main memory 5 on the basis of commands on the high-speed arithmetic processor 4 in accordance with a data transfer request between the extended memory 7 and the arithmetic main memory 6 from a processor included in a first processor group including the control processor 3, the I/O processor and the like, and a monitor call request of a user program executed on the high-speed arithmetic processor 4. The extended memory data transfer control unit 9 also controls data transfer between the extended memory 7 and the control main memory 5 in accordance with a data transier request between the extended memory 7 and the control main memory 5, which is issued from a processor included in the first processor group.

The control processor 3 has a disk address designation unit 20 for managing the extended memory 7 as a virtual disk, a memory address designation unit 21 for managing the extended memory 7 as a continuous memory space, and a memory address conversion unit 25 for converting memory addresses designated by the memory address designation unit 21 to physical addresses of the extended memory 7.

The high-speed arithmetic processor 4 has a disk address conversion unit 23 for converting virtual disk addresses designated by the disk address designation unit 20 to physical addresses of the extended memory 7, a memory address conversion unit 24 for converting memory addresses designated by the memory address designation unit 21 to physical addresses of the extended memory 7, and a type discrimination unit 22 for discriminating whether the extended memory 7 is managed as the virtual disk or the continuous memory space.

The control processor 3 has supervisor functions such as job I/O edit processing, file processing, resource management for the I/O processor 2, job scheduling, a compiler and a linker for user programs, and the like.

The high-speed arithmetic processor 4 has a function of being able to execute vector or scalar commands of a user program at high speed, and employs a multiple parallel pipeline system for executing vector calculations especially at high speed. In order to continuously supply data to arithmetic pipelines, the high-speed arithmetic processor 4 is controlled by an arithmetic data transfer control unit 8 to increase a throughput between the high-speed arithmetic processor 4 and the arithmetic main memory 6.

Data transfer between the extended memory 7 and the arithmetic main memory 6 is controlled by commands on the high-speed arithmetic processor 4. Therefore, while transfer is executed between the extended memory 7 and the arithmetic main memory 6, high-speed execution processing of vector or scalar commands of a user program executed on the high-speed arithmetic processor 4 is interrupted.

Figure 2:
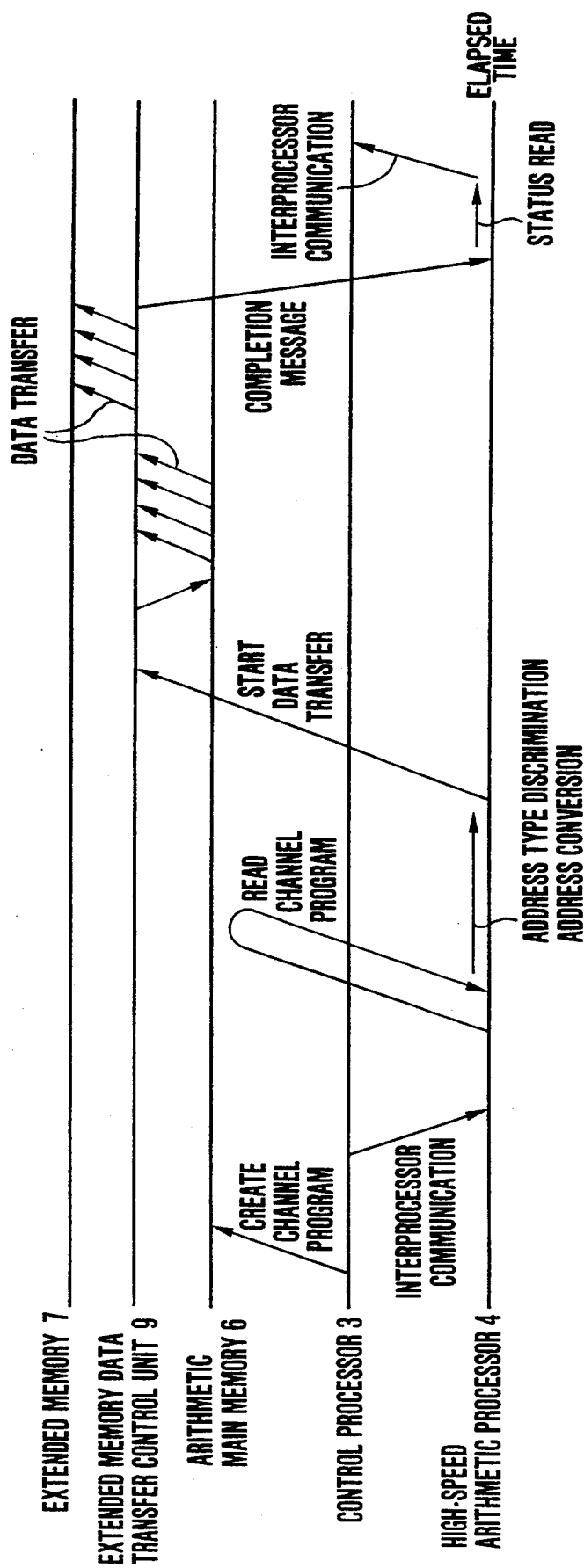
FIG. 2 is a timing chart for explaining a data transfer operation between an extended memory and an arithmetic main memory according to the present invention.

Data transfer between the extended memory 7 and the arithmetic main memory 6 will be described below with reference to FIG. 2 showing units and devices on the vertical axis and elapsed time on the horizontal axis.

Figure 3:
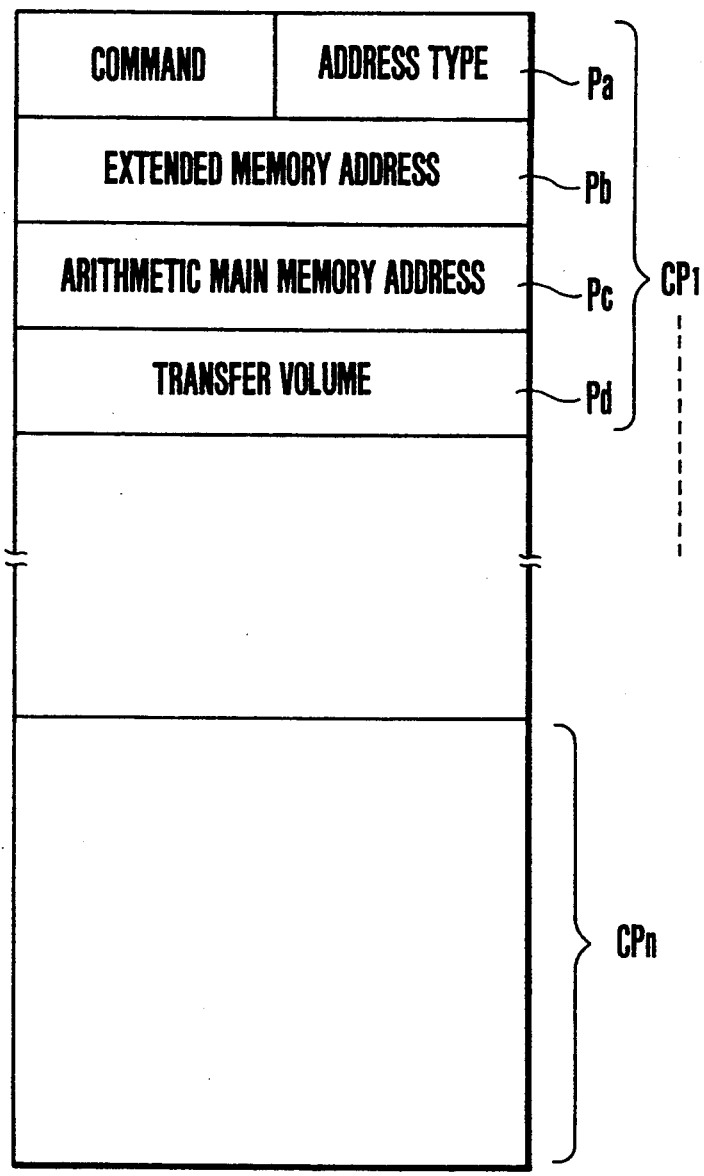
FIG. 3 shows a format of a channel program created in the arithmetic main memory.

When a transfer command between the extended memory 7 and the arithmetic main memory 6 is executed by the control processor 3, a channel program CP shown in FIG. 3 is created in the arithmetic main memory 6.

At this time, an address type Pa and an extended memory address Pb are stored on the channel program CP by the disk address designation means 20 or the memory address designation means 21 in accordance with a format of addresses in the extended memory 7 to be processed by an operating system.

In addition, the channel program CP also includes control information such as an arithmetic main memory address Pc, a transfer length Pd, and the like.

The transfer command is executed as an asynchronous command on the control processor 3. For example, if a certain process includes n transfer commands, n channel programs ($CP_1, \ldots, CP_n$) corresponding to these commands are created, as shown in FIG. 3. The control processor 3 executes interprocessor communication with the high-speed arithmetic processor 4 after it creates all the channel programs.

Upon reception of the interprocessor communication command, the high-speed arithmetic processor 4 reads out channel program information created in the arithmetic main memory 6 by the control processor 3. Thereafter, the type discrimination unit 22 discriminates whether the extended memory 7 is managed as a virtual disk or a continuous memory space. According to a discrimination result, the extended memory address is converted to the physical address using the disk address conversion unit 23 or the memory address conversion unit 24.

The high-speed arithmetic processor 4 executes an extended memory data transfer command, and sends control information such as a type of command, the converted physical address of the extended memory 7, the start address of the arithmetic main memory 6, and the like, thus starting data transfer between the arithmetic main memory 6 and the extended memory 7.

The extended memory data transfer control unit 9 sequentially reads data from the arithmetic main memory 6, and transfers them to the extended memory 7.

Upon completion of data transfer, a message indicating this is supplied to the high-speed arithmetic processor 4 by interruption from the extended memory data transfer control unit 9.

The high-speed arithmetic processor which received the data transfer completion message reads status to discriminate normality/abnormality of data transfer, and reports the discrimination result to the control processor 3 through the interprocessor communication.

In general, the memory address conversion means, the disk address conversion unit, and the type discrimination unit may be arranged in the system controller 1 in accordance with a hardware volume/performance depending on a system configuration.

Figure 4:
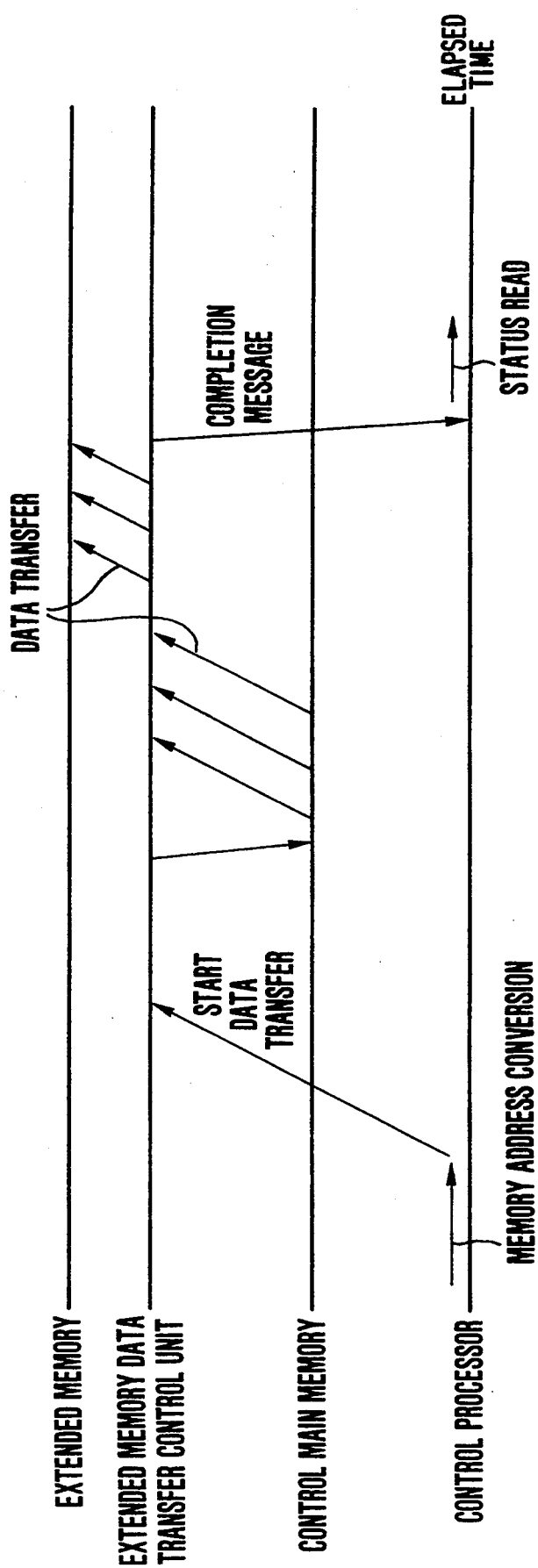
FIG. 4 is a timing chart for explaining a data transfer operation between the extended memory and a control main memory according to the present invention.

Data transfer between the extended memory 7 and the control main memory 5 will be described below with reference to FIG. 4 showing units and devices on the vertical axis and elapsed time on the horizontal axis.

Data transfer between the extended memory 7 and the control main memory 5 is processed by an operating system of only a continuous memory address format.

Therefore, upon execution of the extended memory data transfer command, the control processor 3 causes the memory address conversion unit 25 to convert a designated address of the extended memory 7 to a physical address using a memory address conversion unit 25.

The control processor 3 then sends the start address of the control main memory 5, the start address of the extended memory 7, commands, a transfer data volume, and the like to the extended memory data transfer control unit 9, thus starting data transfer.

Upon completion of data transfer, a message indicating this is supplied from the extended memory data transfer control unit 9 to the control processor 3. The control processor 3 reads status to discriminate normality/abnormality of data transfer.

As described above, according to the present invention, whether the extended memory is managed as a continuous memory address space or a virtual disk address space is designated under the control of an operating system, so that an overhead of managing address spaces can be reduced, as needed, to improve access performance.

In a conventional user program, addresses of the extended memory are processed as virtual disk addresses. However, according to the present invention, a user can execute such a program under the control of an operating system without modifying the program.

What is claimed is:

1. An extended memory address control system in an information processing apparatus for performing data transfer between an extended memory and a main memory, comprising:
    disk address designation means for managing said extended memory as a virtual disk having discontinuous address spaces;
    disk address conversion means for converting a virtual disk address designated by said disk address designation means to a first physical address of said extended memory;
    memory address designation means for managing said extended memory as a continuous memory space;
    memory address conversion means for converting a memory address of said continuous memory address space designated by said memory address designation means to a second physical address of said extended memory;
    type discrimination means for discriminating whether said extended memory is managed as a virtual disk or a continuous memory space; and
    access control means for accessing said extended memory using one of the first and second physical addresses in accordance with type of memory management indicated by said type discrimination means.

2. An extended memory address control system in an information processing apparatus which includes a control processor which has a supervisor function, and realizes input/output control, and a compiler and a linker for a user program, a first main memory for storing a control program for controlling said control processor, a second main memory for storing a load module of the user program, and data, a high-speed arithmetic processor for executing the user program, an extended memory for increasing an input/output speed, and a system controller for controlling said control processor, said first main memory, said high-speed arithmetic processor, and an extended memory, comprising:
    disk address designation means for managing said extended memory as a virtual having discontinuous address spaces;
    disk address conversion means for converting a virtual disk address designated by said disk address designation means to a first physical address of said extended memory;
    memory address designation means for managing said extended memory as a continuous memory space;
    memory address conversion means for converting a memory address of said continuous memory address space designated by said memory address designation means to a second physical address of said extended memory;
    type discrimination means for discriminating whether said extended memory is managed as a virtual disk or a continuous memory space; and
    access control means for accessing said extended memory using one of the first and second physical addresses in accordance with type of memory management indicated by said type discrimination means,
    wherein data transfer between said first main memory and said extended memory executed by said control processor is executed by controlling addresses by only said memory address designation means, and data transfer between said second main memory and said extended memory executed by said high-speed arithmetic processor is executed by controlling addresses by said disk address designation means and said memory address designation means.

3. A method for transferring data between an arithmetic main memory and an extended memory, said method comprising the steps of:
    a) creating a channel program in said arithmetic main memory upon receipt of a transfer command from a control processor requesting a data transfer between said arithmetic main memory and said extended memory;
    b) storing an address type and an extended memory address in said channel program in accordance with a particular format of addresses in said extended memory, wherein said particular format is one of a continuous memory space and a discontinuous memory space;
    c) storing control information in said channel program, wherein said control information includes an arithmetic main memory address and a data transfer length;
    d) executing said transfer command by said control processor;
    e) sending channel program information as given in said steps b) and c) from said control processor to a high speed arithmetic processor;

f) determining by said high speed arithmetic processor whether said extended memory is managed as said continuous memory space or said discontinuous memory space;

g) converting an extended memory address to a physical address based upon said determining made in said step f); and h) transferring data between said arithmetic main memory and said extended memory based on said physical address obtained in said step g).

* * * * *